Figure 1:
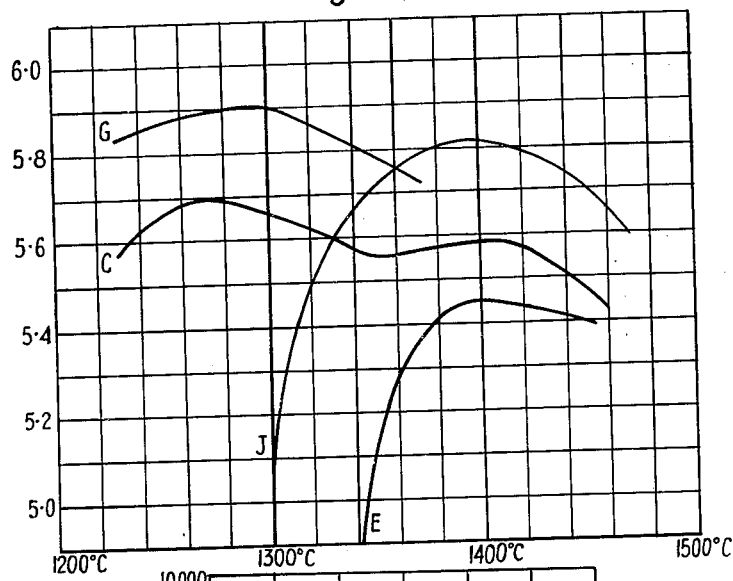

April 18, 1961 K. W. PLESSNER ET AL 2,980,546
CERAMIC DIELECTRIC MATERIALS
Filed April 12, 1957 2 Sheets-Sheet 1

Inventors
Karl Wolfgang Plessner &
Roger West
By
*their* Attorneys

2,980,546

CERAMIC DIELECTRIC MATERIALS

Karl Wolfgang Plessner, Ruislip, and Roger West, South Harrow, England, assignors to British Dielectric Research Limited, London, England, a British company Filed Apr. 12, 1957, Ser. No. 652,481

Claims priority, application Great Britain Apr. 17, 1956

10 Claims. (Cl. 106—39)

Application Ser. No. 583,498, filed May 8, 1956, now U.S. Patent 2,918,381, and application Ser. No. 652,482, filed April 12, 1957, now U.S. Patent 2,955,048 (which is filed on the same day as the present application) relate to ceramic materials based on barium titanate containing as additives a minor proportion of one or more alkaline earth metal stannates and/or zirconates and not more than 1%, based on the total content of other ingredients, of magnesium oxide. In other words the material is one which on analysis shows as ingredients barium oxide, with or without another alkaline earth metal oxide or oxides, magnesium oxide, titania and stannic oxide and/or zirconia, the relationship between the titania content and barium oxide content being substantially stoichiometric for the formation of barium titanate, the relationship between the stannic oxide and/or zirconia content and the content of alkaline earth metal oxide, above the amount of barium oxide stoichiometric to the titania, being substantially stoichiometric for the formation of an alkaline earth metal stannate and/or zirconate (in an amount less than the amount of barium titanate) and the magnesium oxide content being up to 1% of the total weight of alkaline earth metal oxide, zirconia and/or stannic oxide, and titania. In these specifications and in the present specification the term alkaline earth metal includes only calcium, strontium and barium.

The present invention, which is a modification of the invention disclosed in the above applications is based on the discovery that the same effects, namely an increase in the density of the ceramic and an improvement in the temperature coefficient of dielectric constant, can be obtained if the magnesium oxide is replaced by the equivalent molecular proportion of oxide or oxides of iron, nickel, cobalt or manganese.

In accordance with the invention therefore a ceramic dielectric material comprises a fired mixture consisting of barium titanate with a minor proportion of one or more zirconates and/or stannates of alkaline earth metals and containing an addition of one or more of the oxides of iron, nickel, cobalt or manganese, in a total amount which is the molecular equivalent of up to 1% by weight of magnesium oxide, based on the total weight of the other ingredients. In other words the material is one which on analysis shows as ingredients, barium oxide with or without another or other alkaline earth metal oxides, titania, zirconia and/or stannic oxide, and an oxide or oxides of iron, nickel, cobalt and manganese. The barium oxide content is always sufficient to combine with substantially all of the titania and may be in excess over this amount, the excess barium oxide and/or additional alkaline earth metal oxide or oxides being present in an amount sufficient to combine with all of the stannic oxide and/or zirconia present. The total amount of iron, cobalt, nickel or manganese oxide or oxides is the molecular equivalent of an amount of magnesium oxide up to 1% of the total weight of all other ingredients.

We prefer to use the equivalent molecular percentage to ¼% to ¾% by weight of magnesium oxide of one of the oxides of iron, cobalt, nickel or manganese but within these limits we prefer the equivalent of ½% (that is 2.8 mol percent based on the content of all other ingredients).

As is now well known the properties of the system $BaO.MO.TiO_2.XO_2$, where M is an alkaline earth metal other than Ba and X is Sn or Zr, are not substantially changed by small variations in the ratio of BaO to $TiO_2$, provided that the ratio of $(BaO+MO):(TiO_2+XO_2)$ is substantially unchanged and provided that the mol percent of $MTiO_3$ does not rise above 5 mol percent of the total mol content of alkaline earth metal titanate+alkaline earth metal stannate and/or zirconate. Such variations are included in the scope of the present invention.

We have also found that variations in the ratio of the total content of divalent alkaline earth metal ions (BaO with or without MO) to the total content of tetravalent ions ($TiO_2+ZrO_2$ and/or $SnO_2$) can be tolerated, provided that the ratio of the divalent ions to tetravalent ions remains between 0.98:1 and 1.02:1. Such variations are also included in the scope of the present invention.

An important advantage of the present invention is that the standard manufacturing techniques normally used in the manufacture of barium titanate ceramics can be used; for example as described by Bunting, Shelton and Creamer in J. Res. Nat. Bur. Stds. 38, 337, 1947. We prefer to form the ceramic material by mixing together barium carbonate (with or without carbonates of calcium and strontium), titanium dioxide, zirconium oxide and/or stannic oxide and either iron, nickel, cobalt or manganese oxide, prefiring this mixture, grinding it up again and after forming it to the desired shape, firing at a temperature between 1300 and 1400° C.

The proportions of iron, nickel, cobalt or manganese oxide or oxides and the amount of alkaline earth metal zirconate and/or stannate are adjusted within the limits specified above to obtain optimum increase in density (or reduction in firing temperature) consistent with a minimum variation of the dielectric constant over a desired temperature range.

Except for special applications, the alkaline earth metal zirconate or stannate contents will generally not rise above 25 mol percent.

Where more than one stannate and/or zirconate are present, the maximum total content will vary in proportions to the amount of each used, for example with 10% of calcium zirconate (⅖ of the maximum) the maximum content of calcium stannate would be 15% (⅗ of the maximum), and when used in conjunction with 5% of calcium stannate, the maximum content of barium stannate would be 20%.

For normal applications, when the peak of the temperature coefficient of capacitance curve is required to be at about room temperature, quantities much less than these will be used.

Figure 2:
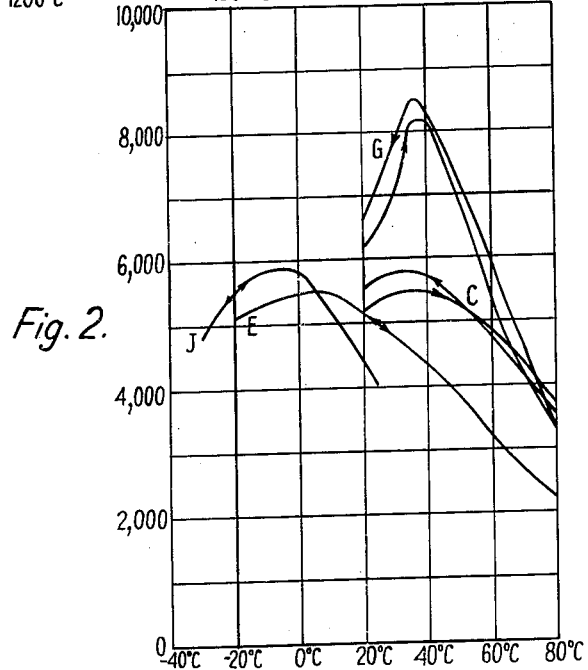
Figure 3:
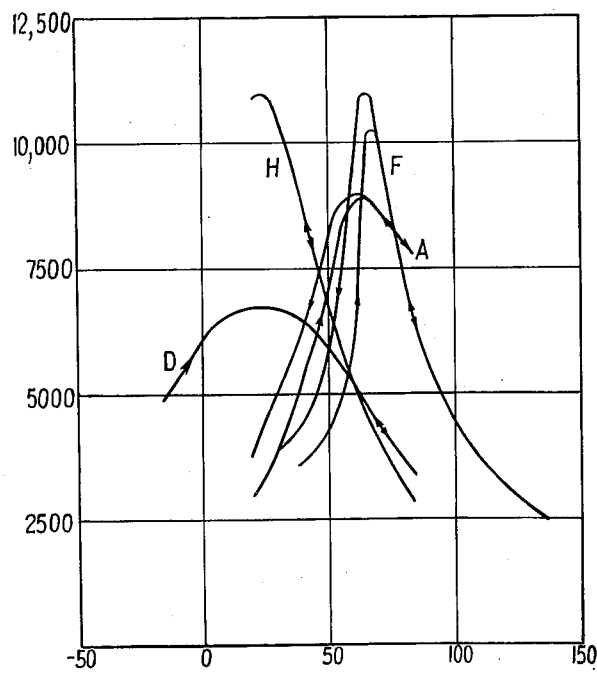

The preparation of and properties of a number of materials in accordance with the invention will now be described by way of example with reference to the accompanying drawings in which Figure 1 is a graph showing the variation of density (vertically) with firing temperature (horizontally) of certain of the compositions and Figures 2 and 3 are graphs showing permittivity (vertically) against temperature (horizontally).

All of the compositions were prepared from commercial raw materials as follows:

Barium carbonate—Laporte "Pure"
Titania—Kronos E Anatase
Calcium carbonate and manganese dioxide—Precipitated
Zirconia—"C.P."

Stannic oxide—"Superlite"
Nickel carbonate and cobalt carbonate—"Laboratory reagent"
Ferric oxide—Calcined All of the materials are of particle size within the range of 0.5–10 microns. We believe that the particle size is not critical.

Quantities of powder calculated to give 100 gm. (after driving off carbon dioxide) of each of the Compositions A to J as set out below were mixed in a rubber-lined flint pebble mill of 750 cc. capacity, using 150 cc. of 0.1% gum arabic solution in water as the dispersing medium. The mill was run for 6 hours at 69 r.p.m., the slip filtered and the dried filter-cake calcined for 3 hours at 1120° C. After the calcination 10–15% water was added as a binder, using a pestle and mortar to incorporate the water and to break up the powder to pass a 25 mesh sieve.

Discs, ⅞″ diameter and approximately 2 mm. thick, were pressed from this powder at 3 tons/sq. inch and fired at various temperatures between 1200° and 1500° C. for 3-hour soak periods. The rate of rise of temperature was approximately 130° C. per hour.

The discs were provided with fired-on silver electrodes and the permittivity (at 50 c./s.) was then recorded as a function of temperature. The temperature range covered was varied so as to include the permittivity peak on the record.

The amounts of ingredients used and the properties of the materials obtained were as set out in the following table in which the figures given for the added oxides are percentages by weight of the total content of barium titanate and calcium zirconate or stannate.

| Composition | | Maximum Density, gm./cc. | Permittivity | | |
|---|---|---|---|---|---|
| | | | 20° C. | Max. value | T max., ° C. |
| A | 91 $BaTiO_3$ | 1.08% $MnO_2$ | 5.55 | 3,200 | 9,000 | 62 |
| B | 9 $CaZrO_3$ | 0.93% CoO | 5.67 | 6,000 | 7,000 | 42 |
| C | | 1.25% CoO | 5.70 | 5,300 | 6,000 | 31 |
| D | | 0.93% NiO | 5.49 | 6,900 | 6,900 | 25 |
| E | | 1.0% $Fe_2O_3$ | 5.45 | 5,450 | 5,700 | 2 |
| F | 94.5 $BaTiO_3$ | 1.08% $MnO_2$ | 5.86 | 3,600 | 11,000 | 63 |
| G | 5.5 $CaSnO_3$ | 0.93% CoO | 5.91 | 6,500 | 8,500 | 37 |
| H | | 0.93% NiO | 5.90 | 11,000 | 11,000 | 23 |
| J | | 0.99% $Fe_2O_3$ | 5.82 | 5,200 | 6,000 | −6 |

Referring to the drawings, in Figures 2 and 3 the measurements of permittivity were made with the temperature both rising and falling as indicated by the arrows.

From the drawings and the above tables it will be seen that the cobalt oxide additions give materials with the highest density. Although higher densities are obtained when the materials contain calcium stannate, these materials have a sharper permittivity peak than the materials containing calcium zirconate.

In the following claims the expression "materials which yield on firing" alkaline earth metal oxides, titanium dioxide etc., is intended to include the oxides per se.

What we claim as our invention is:

1. A barium titanate ceramic dielectric material consisting essentially of barium oxide, an alkaline earth oxide, an oxide from the group consisting of iron, nickel, cobalt and manganese oxide, titania and an oxide selected from the group consisting of stannic oxide and zirconia, the relationship between the barium oxide content and titania content being substantially stoichiometric for the formation of barium titanate, the relationship between the alkaline earth oxide content and the content of said group zirconia and stannic oxide being substantially stoichiometric for the formation of at least one of an alkaline earth stannate and zirconate in an amount less than the amount of barium titanate and at least 2% by weight of the barium titanate and said one of alkaline earth stannate and zirconate together, and the content of the oxide from the group consisting of iron, nickel, cobalt and manganese being the molecular equivalent of ¼%–1% of magnesium oxide based on the total weight of all other ingredients.

2. A ceramic material in accordance with claim 1 in which the relationship between the barium oxide and titanium dioxide content is varied from stoichiometric to the extent that the excess of one of these constituents is sufficient to form a molar percentage not greater than 5 of one compound selected from the group consisting of alkaline earth titanate and at least one of barium zirconate and barium stannate, the ratio of $(BaO+$alkaline earth oxide$):($[one of $ZrO_2$ and $SnO_2]+TiO_2)$ being within the limits 0.98:1 and 1.02:1.

3. A barium titanate ceramic dielectric material consisting essentially of barium oxide, an alkaline earth oxide, a heavy metal oxide from the group consisting of iron, nickel, cobalt and manganese, titania and an oxide selected from the group consisting of stannic oxide and zirconia, the relationship between the barium oxide content and titania content being substantially stoichiometric for the formation of barium titanate, the relationship between the alkaline earth oxide content and the content of said group stannic oxide and zirconia being substantially stoichiometric for the formation of an alkaline earth stannate and alkaline earth zirconate in an amount from 2% to 20.5% of the amount of barium titanate and said alkaline earth zirconate and stannate and the heavy metal oxide content being the molecular equivalent of ¼% to 1% of magnesium oxide based on the total weight of all other ingredients.

4. A ceramic material in accordance with claim 3 in which the relationship between the barium oxide and titanium dioxide content is varied from stoichiometric to the extent that the excess of one of these constituents is sufficient to form a molar percentage not greater than 5 of one compound selected from the group consisting of alkaline earth titanate and one of barium stannate and barium zirconate, the ratio of $(BaO+$alkaline earth oxide$):($[one of the group zirconia and stannic oxide$]+TiO_2)$ being within the limits 0.98:1 and 1.02:1.

5. A barium titanate ceramic dielectric material consisting essentially of barium oxide, an alkaline earth oxide, a heavy metal oxide from the group consisting of iron, nickel, cobalt and manganese oxide, titania and an oxide from the group consisting of stannic oxide and zirconia, the relationship between the barium oxide content and titania content being substantially stoichiometric for the formation of barium titanate, the relationship between the alkaline earth oxide content and the oxide of the group stannic oxide and zirconia being substantially stoichiometric for the formation of an alkaline earth zirconate and stannate in an amount less than the amount of barium titanate and at least 2% by weight of the barium titanate and alkaline earth zirconate and stannate together, and the heavy metal oxide content being the molecular equivalent of ½% of magnesium oxide based on the total weight of all other ingredients.

6. A method of manufacturing a barium titanate ceramic dielectric material which comprises mixing together materials which on prefiring consist essentially of barium oxide, titania, an alkaline earth oxide, an oxide from the group consisting of stannic oxide and zirconia and a heavy metal oxide from the group consisting of iron, nickel, cobalt and manganese, prefiring this mixture, grinding the prefired mixture, shaping it and firing it to form a ceramic material, the amounts of the ingredients used being such as to form barium titanate, a member of the group consisting of alkaline earth stannates, zirconates and mixtures thereof in an amount less than the amount of barium titanate but at least 2% by weight of the barium titanate and said group alkaline earth stannate and zirconate member together and an amount of said heavy metal oxide equal to the molecular equivalent of ¼%–1% of magnesium oxide based on the total weight of all other ingredients.

7. A method in accordance with claim 6 in which the relationship between the barium oxide and titanium dioxide content is varied from stoichiometric to the extent that the excess of one of these constituents is sufficient to form a molar percentage not greater than 5 of one compound selected from the group consisting of alkaline earth titanate and at least one of the group consisting of barium zirconate and stannate, the ratio of (barium oxide+alkaline earth oxide):([said group of zirconia and stannic oxide]+titania) being within the limits 0.98:1 and 1.02:1.

8. A method of manufacturing a barium titanate ceramic dielectric material which comprises mixing together materials which on prefiring consist essentially of barium oxide, titania, an alkaline earth oxide, an oxide from the group consisting of stannic oxide and zirconia, and a heavy metal oxide from the group consisting of iron, cobalt, nickel, and manganese, prefiring this mixture, grinding the prefired mixture, shaping it and firing it to form a ceramic material, the amounts of the ingredients used being such as to form barium titanate, 2% to 20.5% of one member selected from the group consisting of alkaline earth stannates, zirconates and mixtures thereof based on the weight of barium titanate and said group alkaline earth stannate and zirconate member and an amount of said heavy metal oxide equal to the molecular equivalent of ¼ to 1% of magnesium oxide based on the total weight of all other ingredients.

9. A method in accordance with claim 8 in which the relationship between the barium oxide and titanium dioxide content is varied from stoichiometric to the extent that the excess of one of these constituents is sufficient to form a molar percentage not greater than 5 of one compound selected from the group consisting of alkaline earth titanate and at least one member from the group consisting of barium stannate and barium zirconate, the ratio of (barium oxide+alkaline earth oxide):([said group of zirconia and stannic oxide]+titania) being within the limits 0.98:1 and 1.02:1.

10. A method of manufacturing a barium titanate ceramic dielectric material which comprises mixing together materials which on prefiring consist essentially of barium oxide, titania, alkaline earth oxide, an oxide from the group consisting of stannic oxide and zirconia, and a heavy metal oxide from the group consisting of iron, nickel, cobalt and manganese, prefiring this mixture, grinding the prefired mixture, shaping it and firing it to form a ceramic material, the amounts of the ingredients used being such as to form barium titanate, 2% to 20.5% of one member selected from the group consisting of alkaline earth stannates, zirconates and mixtures thereof and an amount of heavy metal oxide equal to the molecular equivalent of ½% of magnesium oxide based on the total weight of all other ingredients.

References Cited in the file of this patent

UNITED STATES PATENTS

| | | |
|---|---|---|
| 2,402,516 | Wainer | June 18, 1946 |
| 2,402,518 | Wainer | June 18, 1946 |
| 2,695,239 | Oshry | Nov. 23, 1954 |
| 2,695,240 | Oshry | Nov. 23, 1954 |
| 2,803,553 | Oshry | Aug. 20, 1957 |
| 2,815,291 | Rogatz | Dec. 3, 1957 |